United States Patent [19]

Glöckner et al.

[11] Patent Number: 4,511,253
[45] Date of Patent: Apr. 16, 1985

[54] DEVICE FOR MEASURING THE TRANSVERSE DIMENSION OF A THREAD

[75] Inventors: Rolf Glöckner, Egg; Hansruedi Stutz, Dietlikon, both of Switzerland

[73] Assignee: Gebrüder Loepfe AG, Wetzikon, Switzerland

[21] Appl. No.: 417,190

[22] Filed: Sep. 10, 1982

[30] Foreign Application Priority Data

Sep. 30, 1981 [CH] Switzerland .......................... 6290/81

[51] Int. Cl.³ .......................... G01B 11/10; G01B 11/02
[52] U.S. Cl. .................................... 356/385; 250/560; 356/429
[58] Field of Search ............... 356/384–386, 356/429, 430; 250/559, 560, 562, 563, 571, 572; 358/106, 107

[56] References Cited

U.S. PATENT DOCUMENTS 4,294,545 10/1981 Stutz ............................. 250/560 X
4,306,812 12/1981 Lapp et al. ......................... 356/385

Primary Examiner—F. L. Evans
Attorney, Agent, or Firm—Werner W. Kleeman

[57] ABSTRACT

A device for measuring the transverse dimension, such as the diameter of a textile thread, comprises a light source, a linear array of optoelectrical sensors, a clock for periodically scanning the linear array, and electronic circuitry for evaluating the serial signals furnished by the linear array. The electronic circuitry comprises amplifying means, a limiter such as a Schmitt-trigger, and means for integrating the pulse amplitudes furnished by the linear array over a plurality of scanning periods or cycles. Further, means are provided for automatically controlling the response of the electronic circuitry in inverse proportion to the averaged output of the integrating means.

6 Claims, 4 Drawing Figures 4,511,253

DEVICE FOR MEASURING THE TRANSVERSE DIMENSION OF A THREAD

CROSS REFERENCE TO RELATED CASES

This application is related to the commonly assigned U.S. Pat. Nos. 4,294,545 and 4,306,812.

BACKGROUND OF THE INVENTION

The present invention relates to a device for measuring the transverse dimension of a thread by means of optoelectronical thread scanning means and thereto connected signal evaluation circuitry.

The term "thread" as used hereinafter generally encompasses thread-like and endless structures of textile or other kinds of structures, such as, for instance, monofilaments, yarns, glass fibers, wires and the like.

In U.S. Pat. No. 4,294,545 there are described a method and a device for continuously measuring the transverse dimension of a travelling thread-like structure by means of an array of optoelectrical sensors. By scanning the signal condition of the array in successive cycles there are produced serial digital scanning signals. By this particular measure there is eliminated the ground signal and the effect thereon of irregular contamination of the optical measuring area in which the thread travels. The ground signal is the scanning signal existing when there is no thread present in the measuring area.

SUMMARY OF THE INVENTION

It is a primary object of the present invention to provide a novel and improved measuring device in which all slow or long-time variations of the measuring device are compensated and thus made ineffective.

It is a more specific object of the invention to compensate for any decrease of the light intensity or light beam emanating from the light source, fluctuations of the turbidity of the measuring area, sensitivity losses of the sensors of the array and of the usually thereto connected amplifier.

In the following description of the invention there have been disclosed and illustrated the serial processing of digital signals furnished by a linear array of optoelectrical sensors and means for suppressing the effect of variations in the measuring device upon the output signals thereof.

BRIEF DESCRIPTION OF THE INVENTION

The invention will be better understood and objects other than those set forth above will become apparent upon consideration of the following detailed description thereof which makes reference to the annexed drawings wherein.

DETAILED DESCRIPTION OF THE PREFERRED EMBODIMENTS

Figure 1:
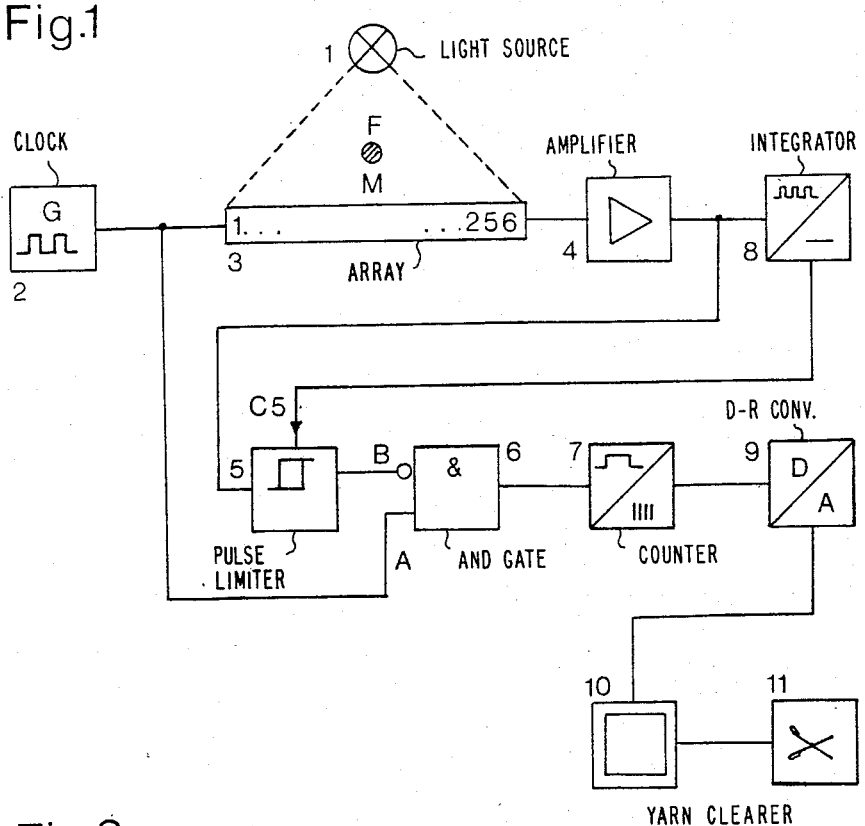
FIG. 1 shows a first embodiment of the measuring device and the thereto connected analog yarn clearing circuitry in block schematic.

With reference now to FIG. 1, the measuring device 1-9 consists of an optoelectronical thread scanning device 1-3 and a thereto connected signal evaluation circuitry 4-9. The optoelectronical thread scanning device 1-3 comprises a light source 1 producing diverging or beamed light, a clock or timer 2, and a linear array of semiconductor light sensors 3, such as photodiodes or charge-coupled optoelectrical elements, and briefly referred to herein as the linear array 3. The dashed lines between the light source 1 and the ends of the linear array 3 confine a measuring area M, where a cross-section of a thread F is represented.

The linear array 3 comprises a multiplicity of, e.g. 256, light sensors. The clock 2 produces e.g. 256 clock pulses per scanning cycle for periodically scanning the linear array 3. In the first line of FIG. 2 at 2A, there are schematically represented nine of the clock pulses.

The signal evaluating circuitry 4-9 comprises a measuring channel 4-7,9, and control circuitry comprising an integrator 8. An analog yarn clearer 10,11 is connected to the measuring channel 4-7,9.

The measuring channel 4-7,9 comprises a series connection of an amplifier 4, a pulse limiter 5 having controllable responsiveness, such as a Schmitt-trigger, an AND-gate 6 having a first input A and a second negated input B, an electronic counter 7, and a digital-to-analog converter 9.

The Schmitt-trigger 5 is provided with a control input C5 defining a control terminal for controlling the responsiveness thereof. The not particularly referenced output of the Schmitt-trigger 5 is connected with the second negated input B of the AND-gate 6 whose first input A is connected to the clock 2. An integrator 8 is connected, in parallel to the Schmitt-trigger 5, to the output of the amplifier 4. The output of the integrator 8 is connected to the control input C5 of the Schmitt-trigger 5.

To the digital-to-analog converter 9 there are connected in series the electronic circuitry 10 of an analog operating yarn clearer, and a yarn severing device 11. The electronic circuitry 10 and yarn severing device 11 may be conventionally constructed in various manners, as are well known in the art, and thus need not here be illustrated in any greater detail.

Now with reference to FIG. 2 the mode of operation of the measuring device 1-9 shown in FIG. 1 will be described. As stated above, the clock 2 produces, during each scanning cycle, a series of clock pulses whose waveform is represented at 2A. When there is no thread and no turbidity in the measuring area M, a similar series of pulses having substantially equal amplitudes appears at the output of the linear array 3 and amplifier 4.

Figure 2:
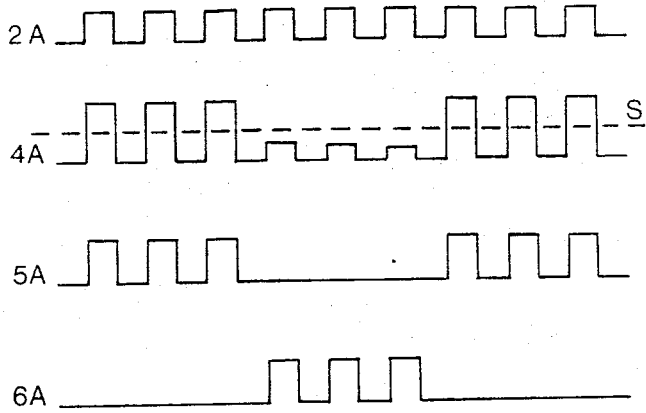
FIG. 2 shows pulses generated in the measuring device of FIG. 1 for illustrating the mode of operation thereof.

The second line in FIG. 2 shows a sequence of sensor pulses 4A of various amplifiers, such as appear at the output of the linear array 3 and amplifier 4 with thread inserted in the measuring area M. Each of the high or light pulses indicates an illuminated light sensor, each of the low or dark pulses a non-illuminated light sensor whose number, by way of example, herein is three. The dashed line S represents the threshold or responsiveness of the Schmitt-trigger 5.

The output of the Schmitt-trigger 5 is shown at 5A. There, an output pulse of constant or uniform amplitude corresponds to a high or light pulse of the sequence 4A, which exceeds the threshold line S, whereas each of the low or dark pulses of the sequence 4A is suppressed.

The AND-gate 6 delivers an output signal 6A representing the non-illuminated sensors or the three dark pulses of the sequence 4A. This number is counted in the electronic counter 7, whose digital output is converted, in the digital-to-analog converter 9, into an analog signal whose value represents the diameter of the thread F. This analog signal is further processed in the electronic circuitry 10 of the yarn clearer in a manner well known in the art. The yarn severing device 11 becomes effective only when the signal shown at 6A, FIG. 2, or the output of the electronic counter 7 surmounts a certain or preset threshold value.

The integrator 8 is preferably arranged such as to deliver the arithmetical average of the pulse amplitude furnished by the amplifier 4 over a multiplicity of successive scanning cycles. Generally and for various applications of the measuring device 1-9, the number of such scanning cycles should be at least ten, in order to generate a reliable average.

Thus, the integrator 8 forms, from the sequence of output or sensor pulses of the amplifier 4, an average signal depending upon the amplitudes of all the sensor pulses 4A, that means upon the diameter of the inserted thread and the eventually present turbidity of the measuring area M. The average signal becomes smaller with increasing turbidity and increasing diameter of the thread.

The average signal acts, through the control input C5, upon the Schmitt-trigger 5, such as to control the threshold S thereof. Consequently, the value of the threshold S is controlled in synchronism or proportionally with the light beam or stream impinging upon the linear array 3. Thus, when the light beam or stream decreases due to increasing turbidity, the integrator 8 compensates for that decrease by lowering the threshold S of the Schmitt-trigger 5, or, in other words, by increasing the responsiveness thereof. That means that the said responsiveness is controlled in inverse proportion to the value of the averaged output or long-time average signal of the linear array 3.

When using the measuring device 1-9 together with a yarn clearer 10,11 on an automatic yarn winder, the time-constant of the integrator 8 should be dimensioned such that the usual variations of the diameter of the thread F do not have any substantial effect upon the regulation or control process. In this event, an appropriate value of the time-constant may be substantially greater than the duration of ten scanning periods.

Figure 3:
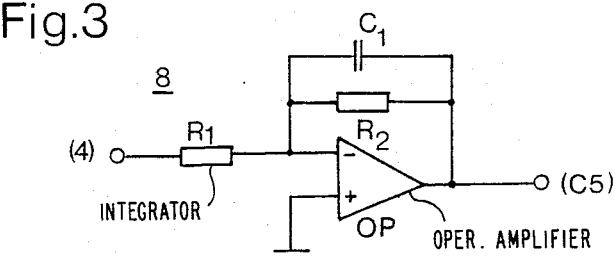
FIG. 3 illustrates details of the arrangement of one of the circuits provided in FIG. 1.

FIG. 3 shows details of an embodiment of an integrator 8 as may be used in the arrangement of FIG. 1, comprising an operational amplifier OP whose output is coupled, through a capacitance $C_1$, to the inverting input terminal of the operational amplifier OP. An input resistance $R_1$ together with the capacitance $C_1$ and the amplification or gain v, defines the time-constant $\tau = v \cdot R_1 \cdot C_1$ of the integrator 8. The resistance $R_2$ connected in parallel to the capacitance $C_1$ has a high value and impedes the operational amplifier OP from being driven into saturation.

Figure 4:
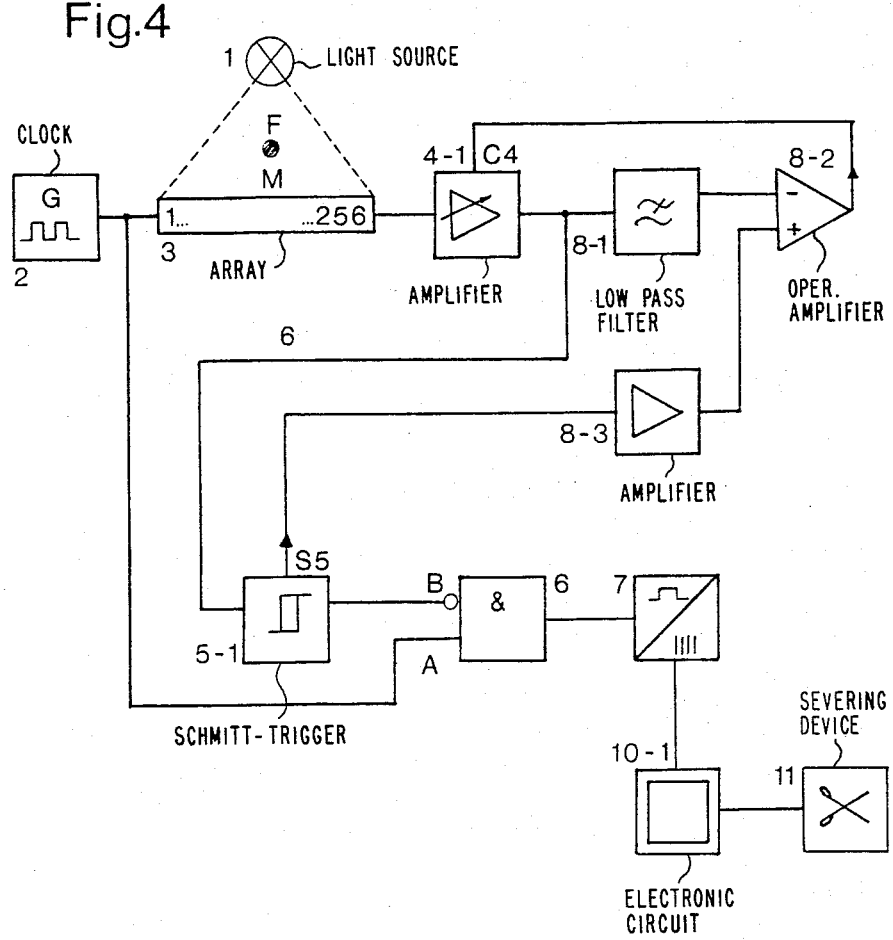
FIG. 4 shows a second embodiment of the measuring device cooperating with a digital yarn clearer.

A second embodiment of the measuring device is shown in FIG. 4, wherein components of similar or analogous function have been conveniently designated with the same reference characters as used in FIG. 1. For components of modified function, there are used the same reference characters or numerals, however supplemented with an additional index, e.g. 4-1.

The optoelectronical thread scanning device 1-3 corresponds to the one shown in FIG. 1.

An amplifier 4-1 having controllable amplification or gain is connected to the linear array 3. Between the output of the amplifier 4-1 and a control input C4 thereof, there is provided a feedback network comprising a series connection of a low-pass filter 8-1 having a large time-constant, and an operational amplifier 8-2. In place of the low-pass filter 8-1, there might be provided an integrator 8 as shown in FIG. 1.

Whereas the integrator 8, FIG. 1, acts as a forward regulation circuit or direct control, the network 8-1,8-2 effects a backward regulation or indirect control acting upon the controllable amplifier 4-1. The threshold value S of the Schmitt-trigger 5-1 is set at a fixed level, and the input thereof is connected to the output of the controllable amplifier 4-1.

The output of the low-pass filter 8-1 is connected to the inverting input terminal of the operational amplifier 8-2. Moreover, there is connected an additional amplifier 8-3 between a threshold value or control output S5 defining a control terminal of the Schmitt-trigger 5-1 and the non-inverting input terminal of the operational amplifier 8-2. The threshold value output S5 furnishes a voltage which represents the threshold value of the Schmitt-trigger 5-1. This voltage is amplifier in the amplifier 8-3 by a multiple, e.g. twice. Thus, the operational amplifier 8-2 responds when the output signal of the low-pass filter 8-1 surmounts the double threshold value of the Schmitt-trigger 5-1, effecting a reduction of the amplification or gain of the controllable amplifier 4-1.

The AND-gate 6 and an electronic counter 7 are connected in the same manner as shown in FIG. 1. However, a digital electronic circuit 10-1 of a yarn clearer is provided and connected to the output of the electronic counter 7.

The pulse waveforms shown in FIG. 2 may also be utilized for demonstrating the mode of operation of the circuits illustrated in FIG. 4, when the waveforms shown at 4A are appropriately interpreted. As stated above with reference to FIG. 4, the threshold value S of the Schmitt-trigger 5-1 is set at a fixed level; the amplitude of the amplified sensor pulses 4A is controlled by means of the low-pass filter 8-1 and operational amplifier 8-2.

The action of the feedback circuits each of which comprises an averaging integrator 8 or 8-1, respectively, may also be formulated in the following manner: when the output signal of the amplifier 4 or 4-1 decreases at a low or long-time rate, the proportion of the averaged amplitude of the pulses furnished by the amplifier 4 or 4-1, to the threshold value S of the Schmitt-trigger 5 or 5-1, respectively, remains unchanged. Thus, it is ensured that the low or dark pulses can be distinguished from the light or high pulses even if the responsiveness of the array 3 decreases due to dust, turbidity or ageing of the light sensors.

While there are shown and described present preferred embodiments of the invention, it is to be distinctly understood that the invention is not limited thereto, but may be otherwise variously embodied and practiced within the scope of the following claims.

Accordingly, what we claim is:

1. A device for measuring the transverse dimension of a thread by means of optoelectronical thread scanning means and thereto connected signal evaluation circuitry:

(A) the optoelectronical thread scanning means comprising:
  (i) a light source for illuminating the thread;
  (ii) an array of optoelectronical sensors receiving light emanating from the light source and modulated by the thread;
  (iii) clock means producing, in successive scanning cycles, pulse series for scanning the array of optoelectrical sensors; and
(B) the signal evaluation circuitry comprising:
  (i) amplifying means operatively connected to the array of optoelectrical sensors;
  (ii) signal limiting means having a signal input connected to the amplifying means, and a control terminal;
  (iii) signal integrating means connected between the amplifying means and said control terminal; and
  (iv) logic means having a first input connected to the clock means and a second input connected to the signal limiting means.

2. The device as defined in claim 1, wherein:
the signal integrating means is structured such as to average the pulse amplitudes delivered by the array of optoelectrical sensors over an interval of at least ten scanning cycles.

3. The device as defined in claim 1, wherein:
the logic means comprises an AND-gate having a first non-negated input and a second negated input.

4. The device as defined in claim 1, wherein:
the amplifying means is adjusted to a fixed amplification value;
the signal limiting means comprises a Schmitt-trigger having a control input defining said control terminal for controlling the responsiveness thereof; and
the integrating circuit being connected between the amplifying means and said control input.

5. The device as defined in claim 1, wherein:
the amplifying means comprises a controllable amplifier having a signal input connected to the array of optoelectrical sensors;
said controllable amplifier having a control input for controlling the amplification thereof; and
the signal limiting means comprises a Schmitt-trigger whose responsiveness is adjusted to a fixed value, and which has a control output operatively connected to the control input of the controllable amplifier.

6. The device as defined in claim 5, wherein:
the signal integrating means comprises a low-pass filter and an operational amplifier having an inverting input terminal connected to the low-pass filter, and a non-inverting input terminal connected to the control output of the Schmitt-trigger; and
the output of the operational amplifier is connected to the control input of the controllable amplifier.

* * * * *

UNITED STATES PATENT AND TRADEMARK OFFICE
CERTIFICATE OF CORRECTION

PATENT NO. : 4,511,253
DATED : April 16, 1985
INVENTOR(S) : Glöckner et al

It is certified that error appears in the above—identified patent and that said Letters Patent is hereby corrected as shown below:

Column 2, line 58, after "various" please delete "amplifiers" and insert --amplified--

Column 4, line 26, please delete "amplifier" and insert --amplified--

Signed and Sealed this

Fifteenth Day of April 1986

[SEAL]

Attest:

DONALD J. QUIGG

*Attesting Officer*  *Commissioner of Patents and Trademarks*